June 4, 1974 H. ROSENBAUM Re. 28,036

BASEBALL GLOVE

Original Filed July 15, 1968

INVENTOR
HAROLD ROSENBAUM
BY Seidel & Gonda
ATTORNEYS.

United States Patent Office

Re. 28,036
Reissued June 4, 1974

28,036

BASEBALL GLOVE

Harold Rosenbaum, Overbrook Hills, Pa.
(2615 W. Hunting Park Ave., Philadelphia, Pa. 19129)

Original No. 3,528,107, dated Sept. 15, 1970, Ser. No. 744,904, July 15, 1968. Application for reissue Sept. 15, 1972, Ser. No. 289,451
Int. Cl. A41d *13/08*
U.S. Cl. 2—19 10 Claims

Matter enclosed in heavy brackets [ ] appears in the original patent but forms no part of this reissue specification; matter printed in italics indicates the additions made by reissue.

ABSTRACT OF THE DISCLOSURE

A baseball infielder's glove is disclosed having a one-piece back notched for adjustment. The construction of the back facilitates the provision of a better pocket, prevents slipping of the glove off the player's hand, enables welts along the finger positions to be eliminated, while providing for maximum safety against spiking the back of the player's hand.

*BACKGROUND OF THE INVENTION*

It has been conventional for many years to make a baseball infielder's glove with a substantial opening in the back with an adjustable strap across the bottom. The opening provides for ventilation and facilitates the ease of adjustment whereby a glove may be more universally utilized by players having different sized hands. I have found that many advantages can be provided if the back were made of one piece as opposed to conventional gloves presently utilized wherein the back is formed of a plurality of separate strips stitched together generally along the center of the finger positions. When a one-piece back is used, there are problems presented in that ventilation must be provided for and the glove back must still be adjustable.

*SUMMARY OF THE INVENTION*

In accordance with the present invention, a one-piece back is provided so as to prevent slipping of the glove off the player's hand, and provide maximum safety against spiking the back of the player's hand. Adjustment is facilitated by means of a notch along the lower edge of the back and by utilizing a separate strap which forms no part of the back. When the back is constructed in this manner, the glove is more flexible due to the elimination of welts or seams at the location wherein the fingers join one another. In addition, welts extending along the finger positions are eliminated, thereby making the glove more comfortable. Further, the glove constructed in accordance with the present invention is provided with finger seams which are less likely to tear due to dragging of the fingertips along the ground.

It is an object of the present invention to provide a novel baseball infielder's glove having a one-piece back.

It is another object of the present invention to provide a baseball infielder's glove having a construction which facilitates a better pocket, prevents slipping of the glove off the player's hand, while providing for maximum safety against spiking the back of the player's hand.

It is another object of the present invention to provide a baseball infielder's glove having a one-piece back notched for adjustment while having increased flexibility and increased comfort to the wearer.

It is another object of the present invention to provide a baseball infielder's glove which more readily assumes a claw-like shape.

Other objects will appear hereinafter.

*DESCRIPTION OF THE PREFERRED EMBODIMENT OF THE INVENTION*

Figure 1:
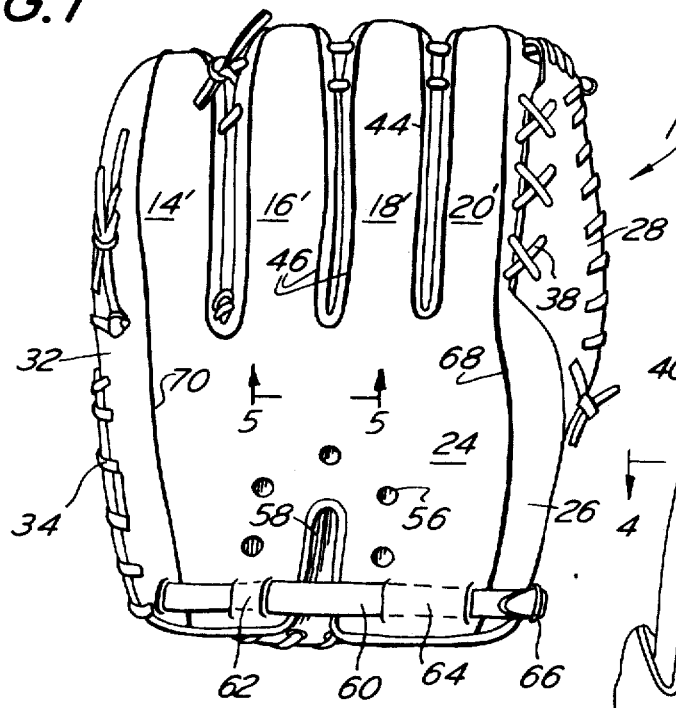
FIG. 1 is a rear view of the glove of the present invention.

Referring to the drawing in detail, wherein like numerals indicate like elements, there is shown a baseball infielder's glove designated generally as 10. The glove 10 is preferably made from leather, although cheaper models thereof may be made from leather-like material.

The glove 10 includes a front 12 having a pocket defined by fingers 14, 16, 18, and 20. The front 12 also includes a thumb 22 which is spaced substantially from the finger 20. As is conventional in the art, the front 12 includes an inner and outer layer of leather which are peripherally joined together and which may be provided with padding therebetween so as to facilitate shaping of the pocket.

The back 24 of the glove 10 is in one piece and includes integral one-piece fingers 14', 16', 18', and 20'. The back 24 does not include a finger position corresponding to thumb 22. Instead, a side panel 26 is provided. The side panel 26 includes a thumb portion. A web 28 is removably attached to the side panel 26, to the thumb 22, and to the finger 20 by rawhide stitching 38.

An edge panel 30 is stitched to the front 12 and the side panel 26. An edge panel 32 is stitched to the front 12 and rear 24 along the finger 14'. Conventional rawhide stitching 34 is providing along the lower periphery of the glove 10 and is provided within the front 12 to facilitate shaping the pocket. Conventional rawhide stitching 36 is provided for interconnecting the various fingers adjacent the tips of the fingers.

Figure 3:
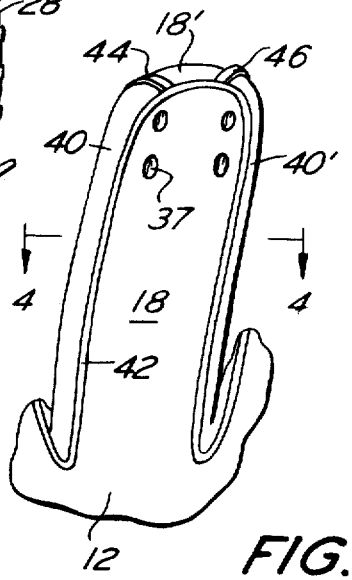
FIG. 3 is a perspective view of one finger of the glove shown in FIGS. 1 and 2.
Figure 5:
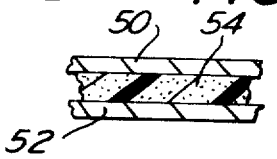
FIG. 5 is a sectional view taken along the line 5—5 in FIG. 1.
Figure 4:
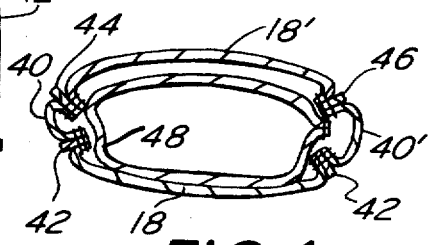
FIG. 4 is a sectional view taken along the line 4—4 in FIG. 3.

As will be apparent from the drawing, there is no stitching provided directly down the center of the fingers at the back of the finger pockets. Heretofore, it was conventional to provide stitching longitudinally up the back of the finger pockets and utilize a back made of a plurality of strips. Such construction resulted in stiffness at the joints between adjacent fingers and interfered with the comfort of the finger pockets. A typical finger construction is shown in FIGS. 3 and 4. The portion of the front 12 extending along finger 18 is provided with holes 37 through which the rawhide stitching 36 will extend.

The front and back of finger 18 are joined together along their sides by finger pieces or panels 40 and 40'. At the front of the finger, there is provided a seam 42 which joins the finger portion of the front 12 to the finger pieces 40 and 40'. The portion of the back 12 along the finger is designated as 18'. The side edges of portion 18' are joined to the finger pieces 40 and 40' by seams 44 and 46 respectively. As shown more clearly in FIG. 3, the seams 42, 44 and 46 do not meet at a common point at the tip of the finger. This construction provides for increased resistance to rubbing and scuffing when the glove is dragged along the ground so that the seams are less likely to rip open. As will be apparent from FIG. 4, the finger may be provided with a linear 48. As shown more clearly in FIG. 4, there is a complete absence of seams along the front or the back of the finger.

The back 24 is preferably made from two thin layers [52 and 54] *50 and 52* as opposed to a single thickness which would detract from flexibility. If desired, a layer of foam rubber *54* or other padding material such as felt may be interposed between the layers 50 and 52. The back 24 is constructed in a manner so as to eliminate the conventional air gap which presents a hazard to the rear of the hand of the player since there is nothing to protect the player from being spiked in this area. As shown more clearly in FIG. 1, substantially the entire back of a player's hand will be protected by the back 24.

The back 24 may be provided with breather holes 56. Such holes may have a diameter of approximately ¼ inch. As illustrated, the glove 10 is adjustable by providing a notch 58 at the lower periphery of the back 24. The holes 56 surround the notch 58. A strap 60 extends across the back 24.

One end of strap 60 is secured in any convenient manner to the edge strip 32. Strap 60 extends through loops or webs 62 and 64 in the back 24 and extends across the notch 58 adjacent the open end of the notch. The right-hand end of strap 60 in FIG. 1 is adjustably secured to a buckle 66. Buckle 66 or any other similar device is preferably secured to the side panel 26 so that the adjustment is made on the side panel 26 below the web 28.

The notch 58 is generally V-shaped. In an operative embodiment of the glove 10, the notch 58 extends upwardly from the bottom edge of the back 24 for a distance of approximately 2 to 2¼ inches and the opening at the lower end of the notch is approximately 1 to 1½ inches. These dimensions may be selectively varied as desired within a certain tolerance or range compatible with the purpose and intent of notch 58. When the strap 60 is tightened, the notch 58 will assume a generally U-shape with the length of the opening at the lower end of the notch being substantially reduced. The notch 58 is preferably located centrally to the back 24 as illustrated in FIG. 1.

Figure 2:
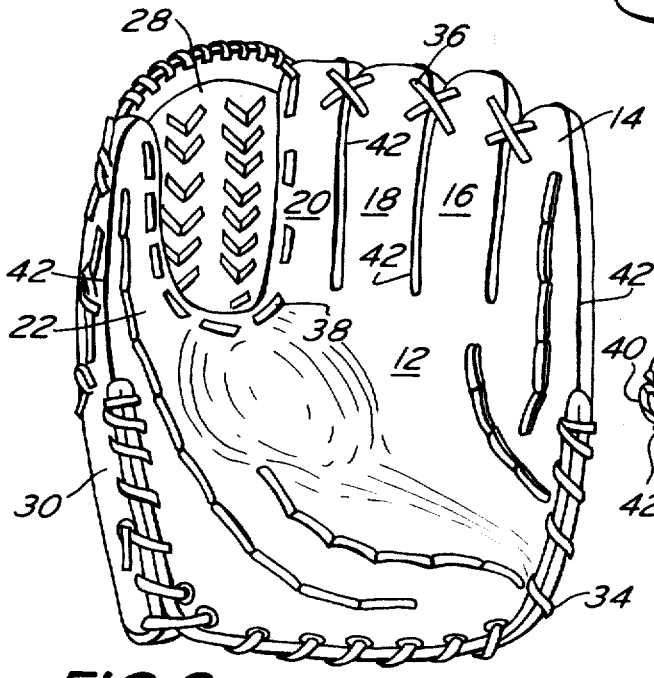
FIG. 2 is a front view of the glove of the present invention.

As will be apparent from FIGS. 2 and 3, the seam 42 extends continuously from the bottom of finger 14 to the bottom of thumb 22. As shown more clearly in FIG. 1, seam 44 extends from the tip of finger 18 to the tip of finger 20 so as to be coextensive with finger piece 40. Also, seam 46 extends from the tip of finger 16 so as to be coextensive with finger piece 40'. Side panel 26 is joined to back 24 by seam 68 which extends from the lower edge of the back 24 to the tip of finger 20'. Panel 32 is joined to back 24 by seam 70 which extends from the lower edge of the back 24 to the tip of finger 14.

When the glove 10 is constructed as described above, it will have the features and advantages referred to heretofore. Those portions of the glove 10 which have not been described in detail heretofore are conventional and no detail explanation is deemed necessary. As used hereinafter, the word "leather" is intended to encompass leather substitutes.

The present invention may be embodied in other specific forms without departing from the spirit or essential attributes thereof and, accordingly, reference should be made to the appended claims, rather than to the foregoing specification as indicating the scope of the invention.

I claim:

1. A baseball infielder's glove having a front and a back *which define a space therebetween,* said front having fingers *for protecting a player's hand,* and a thumb *including a forefinger,* a web secured across the space between the thumb and forefinger of said front, said front and back being made from leather, said back including a one-piece layer for overlying the back of a player's hand and having integral one-piece fingers for overlying the back of a player's finger, said back including inner and outer layers having a layer of foam rubber disposed therebetween, *said back having a lower end,* said back being notched generally at its center lower end, the notch *having an apex and an open end and* being generally V-shaped with the apex being spaced from the lower end of the back, and an adjustable strip extending across the back adjacent the open end of said notch.

2. A glove in accordance with claim 1 wherein the finger panels on the back are uninterrupted across their width, said finger panels being joined to mating finger panels on the front by finger pieces disposed between adjacent fingers.

3. A glove in accordance with claim 1 wherein said front and back are joined together by a side disposed below said web, said strap including an adjustment device [on said side below said web.]

4. A glove in accordance with claim 1 wherein said back *includes inner and outer layers which* are perforated to provide air holes alongside said notch and adjacent the apex of said notch.

5. A baseball infielder's glove having a front and a back, said front having fingers and a thumb, a web secured across the space between the thumb and forefinger on the front, *said front and back being made from leather,* said back including a one-piece layer for overlying the back of a player's hand, said front and back being joined together by a side disposed below said web, said front and back being joined together by a side disposed below said web, said front and back having finger panels uninterrupted across their width, the finger panels on the front being joined to the finger panels on the back by mating finger pieces disposed between adjacent fingers, *said front including inner and outer layers with padding therebetween,* said back being notched generally at its center lower end, the notch being generally V-shaped with the apex being spaced from the lower end of the back, the lower end of the back being juxtaposed to the lower end of the front, and an adjustable strap extending across the back adjacent the open end of the notch, said strap extending through loops in said back on opposite sides of the open end of the notch.

6. A glove in accordance with claim 5 including rawhide stitching interconnecting the fingers adjacent the free end of the fingers, stitching joining the web to the thumb and forefinger, and said back including inner and outer layers which are perforated to provide air holes alongside said notch adjacent the apex of the notch.

7. A glove in accordance with claim 5 wherein at least some of said fingers are provided with a liner.

*8. A baseball infielder's glove for protecting a player's hand, said hand having a back and a front, said glove containing in combination*

*(A) a front*
- *(1) said front containing a thumb and four fingers one of which is a forefinger,*
- *(2) the thumb and forefinger defining a space therebetween*
- *(3) the front including at least one layer;*

*(B) a web secured across the space;*
- *(1) said web extending between the thumb and the forefinger;*

*(C) a back in registry with the front,*
- *(1) said back including a one-piece layer,*
- *(2) said back overlying the back of the player's hand,*
- *(3) said front and back being joined together by a side disposed below the web,*
- *(4) the front and back having finger panels uninterrupted across their width,*
- *(5) the finger panels on the front being joined to the finger panels on the back by mating finger pieces disposed between adjacent fingers,*
- *(6) the back including a lower end, the back being notched with a V-shaped notch having an apex and an open end, the notch being located near the center of the lower end,*
  - *the apex being spaced from the lower end; and*

*(D) an adjustable strap extending across the black adjacent the open end of the notch,*

*(1) said back being provided with loops positioned on opposite sides of the notch,*

*(2) said strap extending through the loops for securing the glove to the player's hand.*

*9. The invention of claim 8 wherein the said front includes inner and outer layers.*

*10. The invention of claim 9 and a layer of padding interposed between the said inner and outer layers.*

References Cited

The following references, cited by the Examiner, are of record in the patented file of this patent or the original patent.

UNITED STATES PATENTS

| | | | |
|---|---|---|---|
| 1,077,061 | 10/1913 | Gamble | 2—19 |
| 1,815,412 | 7/1931 | Lindfelt | 2—19 |
| 1,083,795 | 1/1914 | Brokaw | 2—19 X |
| 2,113,934 | 4/1938 | Denkert | 2—19 |
| 820,120 | 5/1906 | Le Mat | 2—19 |
| 2,200,204 | 5/1940 | Le Mat | 2—19 |

JAMES R. BOLER, Primary Examiner